Feb. 10, 1931.  S. B. CLAY  1,791,613
CONTROL VALVE
Filed July 15, 1929
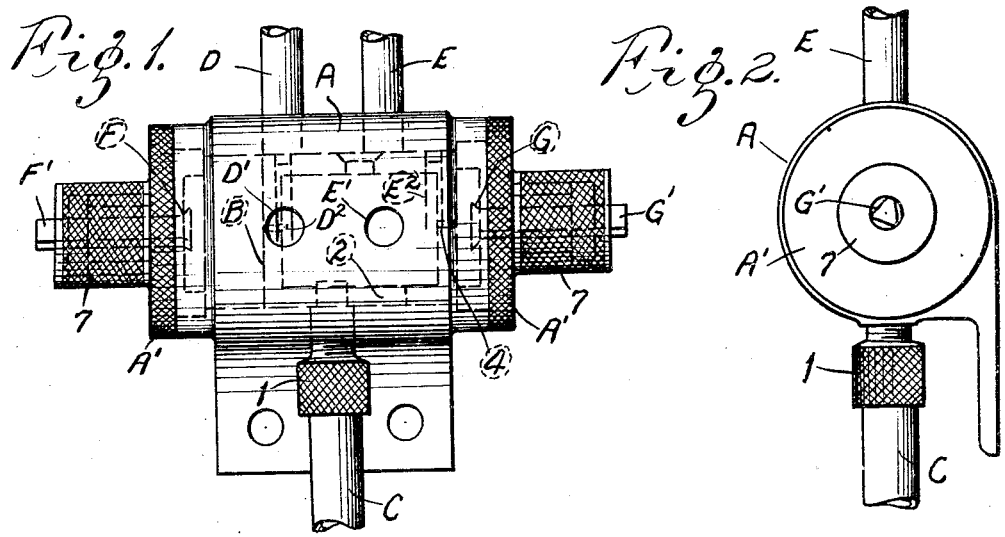
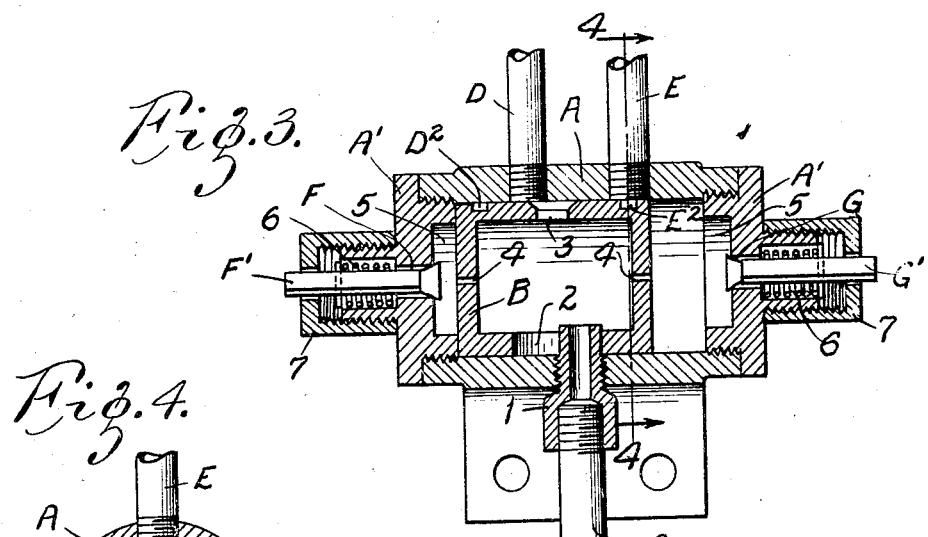
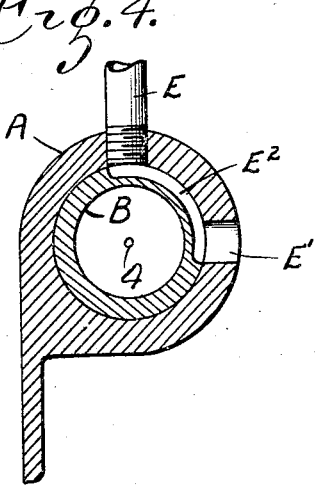
INVENTOR
SAMUEL B. CLAY.
By Bakewell & Church
ATTORNEYS Patented Feb. 10, 1931

1,791,613

UNITED STATES PATENT OFFICE

SAMUEL B. CLAY, OF ST. LOUIS, MISSOURI

CONTROL VALVE

Application filed July 15, 1929. Serial No. 378,452.

This invention relates to a valve that is intended to be used for controlling or governing the operation of a piston or similar part that is moved in opposite directions by an operating medium under pressure, or moved in one direction by an operating medium under pressure, and moved in the opposite direction by a different means, such, for example, as a spring.

One object of my invention is to provide an inexpensive control valve of simple design and rugged construction, that is equipped with a single valve element which governs the admission and exhaust of an operating medium to and from the device with which the valve is associated, or which the valve controls.

Another object is to provide an efficient control valve of simple design, that is equipped with a reciprocating valve element that governs the admission and exhaust of an operating medium to and from the opposite ends of the cylinder which contains the piston whose movements are controlled by the valve.

Another object is to provide a control valve that will not wear rapidly or become leaky, and which is of such design that the pressure of the operating medium governed by the valve is used to effect a change in the position of the valve element.

And still another object is to provide a control valve that is equipped with a reciprocating valve element whose movements in opposite directions are effected by reducing the pressure in the opposite ends of the casing of the valve in which said valve element is positioned. Other objects and desirable features of my invention will be hereinafter pointed out.

Figure 1 is a front elevational view of a control valve constructed in accordance with my invention.

Figure 2 is an end view of said valve.

Figure 3 is a longitudinal sectional view of said valve; and

Figure 4 is a transverse sectional view, taken on the line 4—4 of Figure 3.

In the accompanying drawings which illustrate the preferred form of my invention, A designates the casing of the valve, which is preferably of cylindrical form, B designates a valve element of the piston type or spool type, which is reciprocatingly mounted in said casing, C designates a supply pipe which contains an operating medium under pressure, such, for example, as compressed air, having one of its ends attached to the valve casing and its opposite end communicating with the source of supply of the operating medium, D and E designate supply ports in the valve casing, herein shown as pipes that lead from the valve casing to the opposite ends of a cylinder (not shown) which contains the piston whose movements are controlled by the valve, and D' and E' designate exhaust ports in the casing A of the valve.

The valve element B is hollow and is so constructed that the operating medium supplied to the valve by the pipe C will normally exert a substantially equal pressure on opposite sides or opposite ends of said valve element B. In the form of my invention herein shown the supply pipe C is attached to a nipple 1 threaded into the cylindrical wall of the valve casing A and having its inner end portion positioned in an elongated slot 2 in the cylidrical side wall of the valve element B, said slot 2 being preferably so proportioned that the nipple 1 will serve as a stop that co-operates with the slot 2 in the valve element to limit the movement of said valve element in opposite directions and also to prevent the valve element B from rotating or turning in the valve casing.

The operating medium which the valve controls is admitted to the interior of the valve element B by the supply pipe C, and said operating medium then escapes through a port 3 in the valve element into one or the other of the pipes D or E, depending upon the position of said valve element, the port 3 being formed in the cylindrical portion of the valve element B midway the opposite ends of said valve element, as shown clearly in Figure 3. The valve element B is also provided with exhaust passageways $D^2$ and $E^2$, formed preferably by grooves in the exterior of the valve element B, arranged so that when said valve element is in one of its extreme positions, the groove $D^2$ will register with and establish communication between the pipe D and the exhaust port D' in the valve casing, and when said valve element is in its other extreme position, the groove $E^2$ will register with and establish communication between the pipe E and the exhaust port E' in the valve casing.

In order that the operating medium which the pipe C admits to the interior of the valve element B may enter the opposite ends of the valve casing A, and thus normally exert a substantially equal pressure on opposite sides or opposite ends of the valve element, small leak holes or ports 4 are formed in the end walls of the valve element B, and in order that this balanced condition in pressure may be maintained in the valve casing, even when the valve element B is at the end of its stroke in either direction, the heads or end walls A' of the valve casing are provided with recesses 5. These recesses 5 are so proportioned and arranged that when the valve element B is in either of its extreme positions, with one end of same touching against the opposed end wall of the valve casing, there will be a space or chamber beyond said end which communicates with the interior of the valve element through the leak hole or port 4 in the end of the valve element. Preferably, the end walls A' of the valve casing are detachably connected to the cylindrical wall of said casing by externally screw-threaded portions on said end walls that are screwed into the ends of the cylindrical wall of the casing, as shown in Figure 3.

Normally, the valve element B is maintained in one or the other of its extreme positions, i. e., with the port 3 in same in registration with the pipe D, as shown in Figure 3, or with the pipe E. When the valve element occupies the position shown in Figure 3, the exhaust passageway $E^2$ in the exterior of said valve element registers with the exhaust port E' in the valve casing and the pipe E that leads from the valve to the cylinder of the piston which the valve controls. If the equilibrium in the internal pressure of the casing is destroyed by reducing the pressure in the right-hand end of the valve casing, the valve element B will shift or move into its other extreme position, thus changing the relationship between the ports or passageways in the valve element and the co-operating ports or passageways in the valve casing. Various means may be used to produce an unbalanced condition in the pressure of the operating medium in the valve casing, so as to effect a change in the position of the valve element B, but I prefer to arrange vent valves or venting devices F and G in the end walls of the valve casing for venting either end of the valve casing, said vent valves being preferably of such design that the internal pressure in the valve casing will tend to hold said valve seated and being equipped with stems F' and G' for actuating or unseating said valves. Springs 6 are preferably combined with the stems of the vent valves so as to insure said valves normally remaining in a seated condition, and removable caps 7 are provided so as to house the springs of the vent valves and impart a neat and ornamental appearance to the valve structure. Any other suitable type or kind of means may be provided for venting the end portions of the valve casing, but I have found that vent valves F and G of the kind herein illustrated are inexpensive to construct and are reliable in operation.

As previously stated, when the valve element B is in the position shown in Figure 3, the operating medium will pass from the source of supply through the pipe D, into one end of the cylinder with which the valve is associated, and the opposite end of said cylinder will then be in direct communication with the atmosphere through the pipe E, exhaust passageway $E^2$ in the exterior of the valve element and the exhaust port E' in the valve casing. If it is desired to admit the operating medium to the opposite end of said cylinder, the stem G' of the vent valve G is pushed inwardly so as to permit the operating medium in the right hand end of the valve casing to escape from same through the port controlled by the vent valve G, thereby causing the valve element B to move to the right into its other extreme position, due to the greater pressure which the operating medium exerts on the left hand end of said valve element, as soon as the right hand end of the valve casing is vented. This movement of the valve element B to the right, looking at Figure 3, cuts off communication between the source of supply of the operating medium and the pipe D, cuts off communication between the exhaust passageway $E^2$ in the exterior of the valve element and the pipe E, establishes communication between the source of supply of the operating medium and the pipe E, through the port 3 in the valve element, and also establishes communication between the pipe D and the exhaust port D' in the valve casing through the passageway $D^2$ in the exterior of the valve. It will thus be seen that the simple act of pushing inwardly on the stem of the vent valve G instantly effects a change in the position of the valve element, with the result that the operating medium is admitted to the other end of the cylinder with which the valve is associated, thereby causing the piston in said cylinder to move in the opposite direction. It is not necessary to hold the vent valve G in an unseated condition in order to maintain the valve element in the position into which it moved when the equilibrium of the pressure in the valve casing was destroyed. All that is necessary is to vent the right hand end of the valve casing sufficiently to reduce the pressure on the right hand end of the valve element, whereupon said valve element moves to the right, due to the greater pressure which the operating medium exerts on the left hand end of same, the port which the vent valve G controls being of considerably greater area than the area of the port 4 in the right hand end wall of the valve element, so as to cause the operating medium to escape from the right hand end of the valve casing at a higher rate than the operating medium can enter the right hand end of the casing from the interior of the valve element through the port 4 in the right hand end of said element. When it is desired to restore the valve element to its former position it is only necessary to unseat the vent valve F so as to reduce the pressure on the left hand end of the valve element B, whereupon said valve element will move to the left back to its former position.

While I have herein illustrated my invention embodied in a valve that is intended to be used in conjunction with a double acting piston to control the admission and exhaust of an operating medium to and from the opposite ends of the cylinder in which said piston reciprocates, I wish it to be understood that my invention is not limited to a control valve for a double acting piston, as the valve can be used equally well with a single acting piston, i. e., a piston that is moved in one direction by an operating medium under pressure, and moved in the opposite direction by a spring or other suitable means, by simply omitting or closing up one or the other of the pipes D or E that lead from the casing of the valve to the device which the valve controls. In such an installation the admission of the operating medium to the cylinder of the device with which the valve is associated is effected by unseating the vent valve in one end of the valve casing, and the exhaust of the operating medium from said cylinder is effected by unseating the vent valve in the opposite end of the valve casing A.

My valve is capable of various uses, but it is particularly adapted for use in controlling the operation of machines of the type that comprise a part which is moved in one direction by admitting an operating medium to one end of a cylinder provided with a piston that is operatively connected to said part, and moved in the opposite direction by admitting the operating medium to the opposite end of said cylinder. Obviously, the vent valves which are used to unbalance or destroy the equilibrium of the pressure in the valve casing may be operated manually or by a means that operates automatically in conjunction with the machine or device that the valve controls, and if desired, the pipes D and E that are attached to the valve casing may be combined with headers from which groups of pipes lead to a plurality of cylinders.

Having thus described my invention, what I claim as new and desire to secure by Letters Patent is:

A control valve, comprising a casing provided with a supply port and with an exhaust port, a hollow valve element reciprocatingly mounted in said casing, a device positioned in an elongated slot in said element for admitting an operating medium under pressure to the interior of said valve element, a port in said valve element for establishing communication between the interior of same and the supply port in the casing, a passageway in the exterior of said valve element for establishing communication between the supply port and the exhaust port of the casing, means for equalizing the pressure on the interior and exterior of the valve element, and vent valves for relieving the pressure in the opposite end portions of the casing.

SAMUEL B. CLAY.